June 13, 1950  B. LJUNGSTRÖM ET AL  2,511,276
APPARATUS FOR MEASURING THE THICKNESS OF THE
MATERIAL OF ARTICLES, SUCH AS TUBES, ETC
Filed Feb. 2, 1944  6 Sheets-Sheet 1
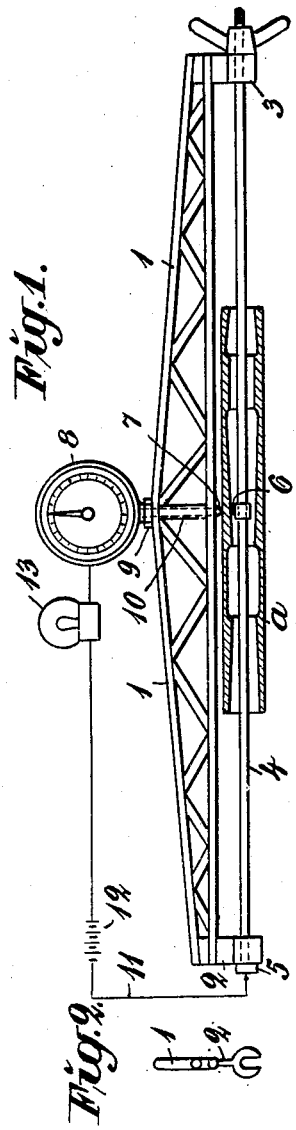
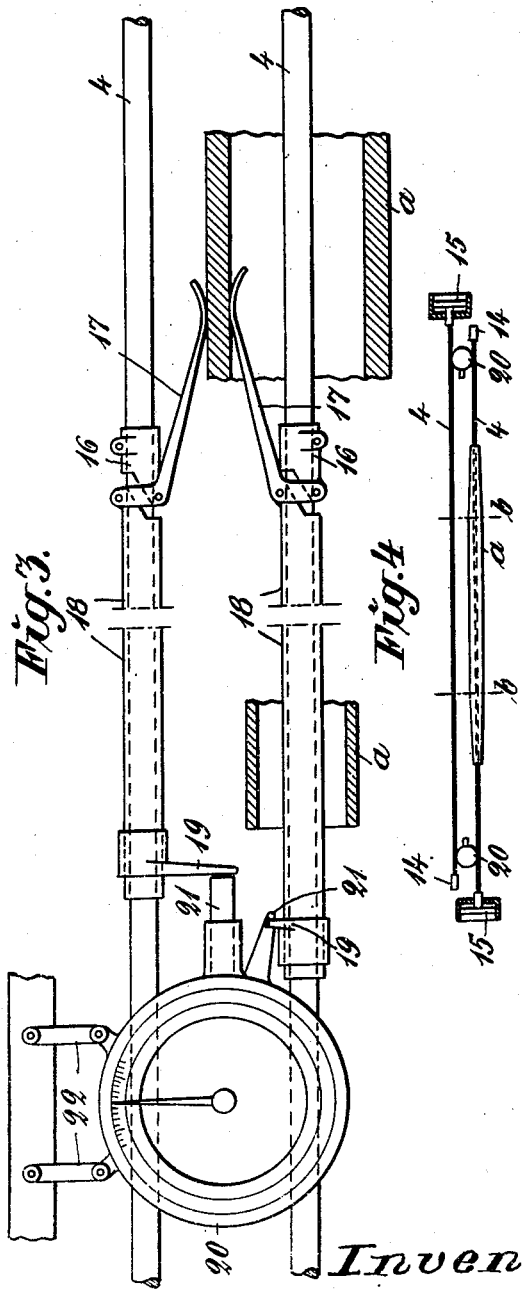
Inventors
B. Ljungström
G. H. Larsson

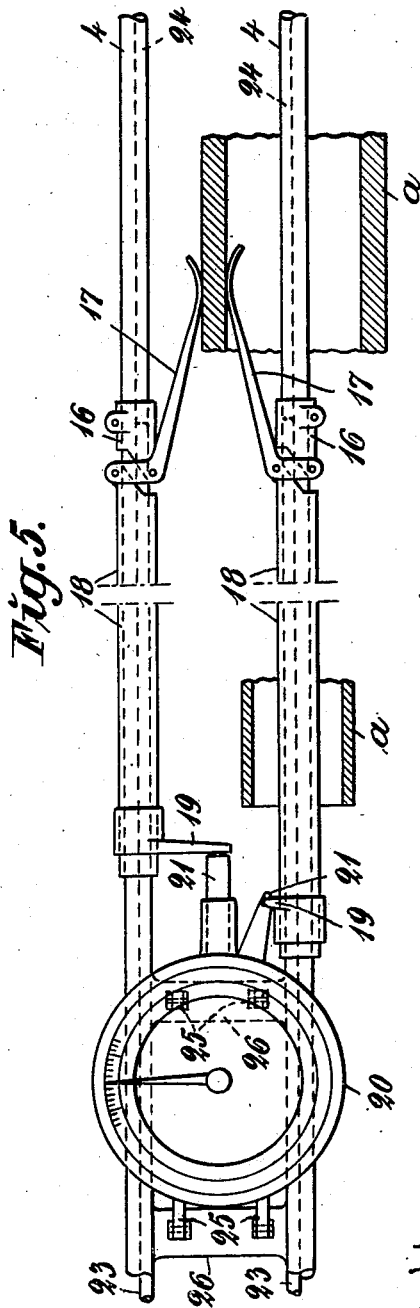

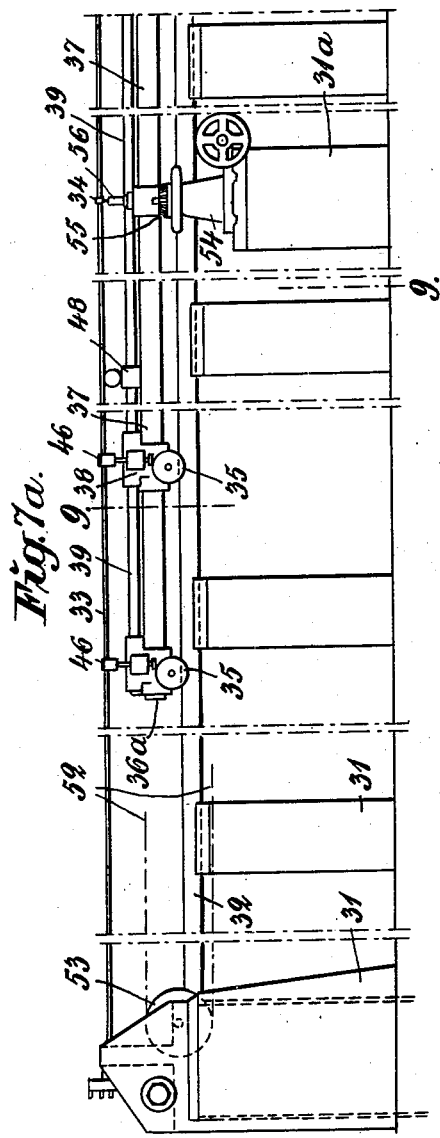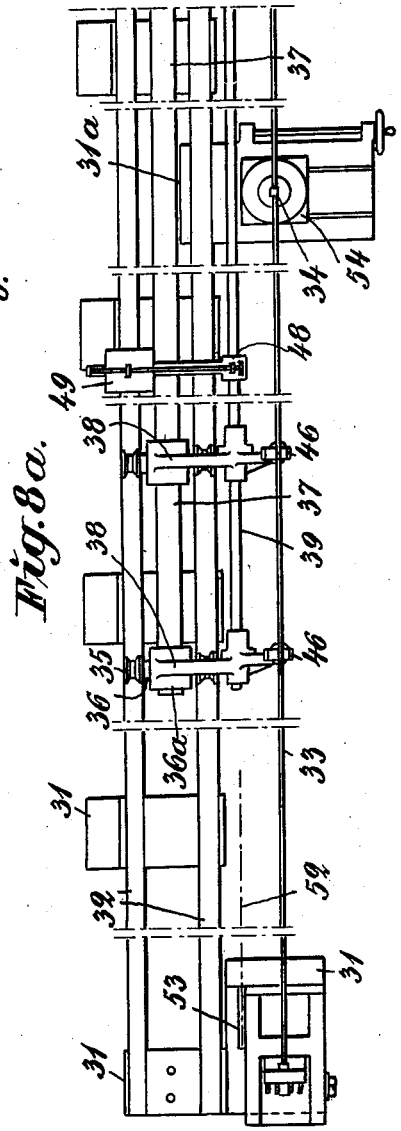

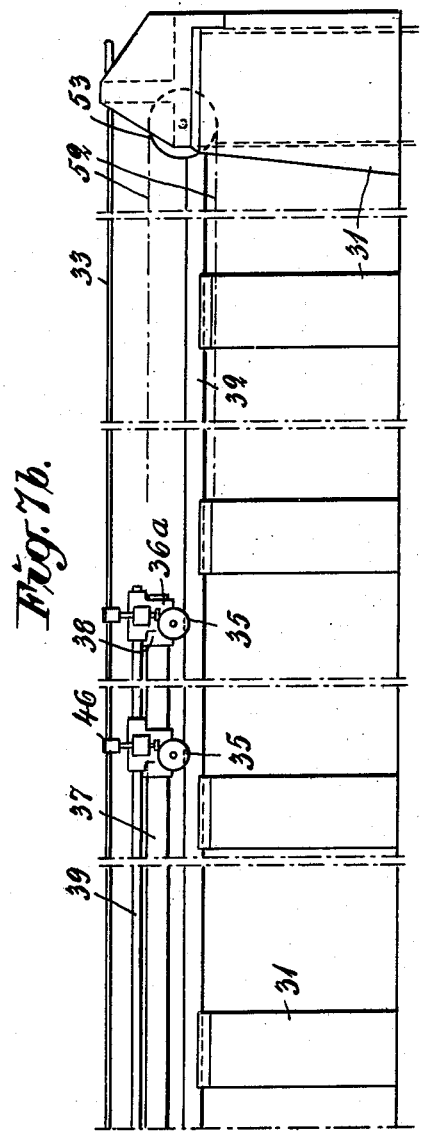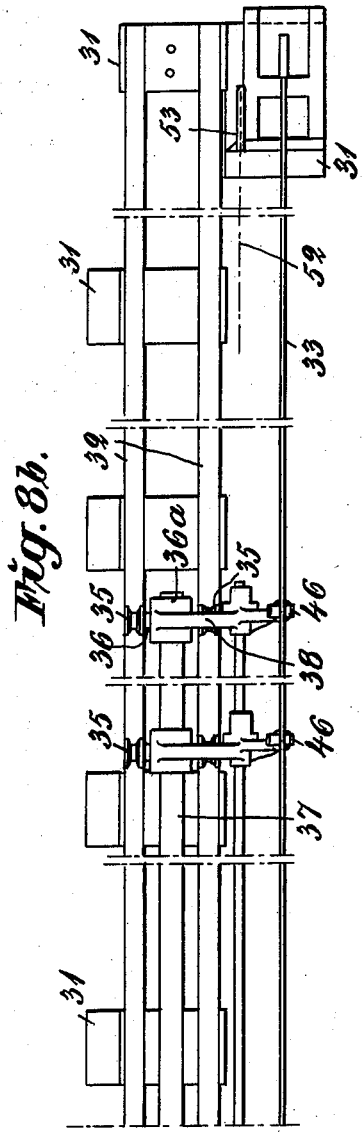

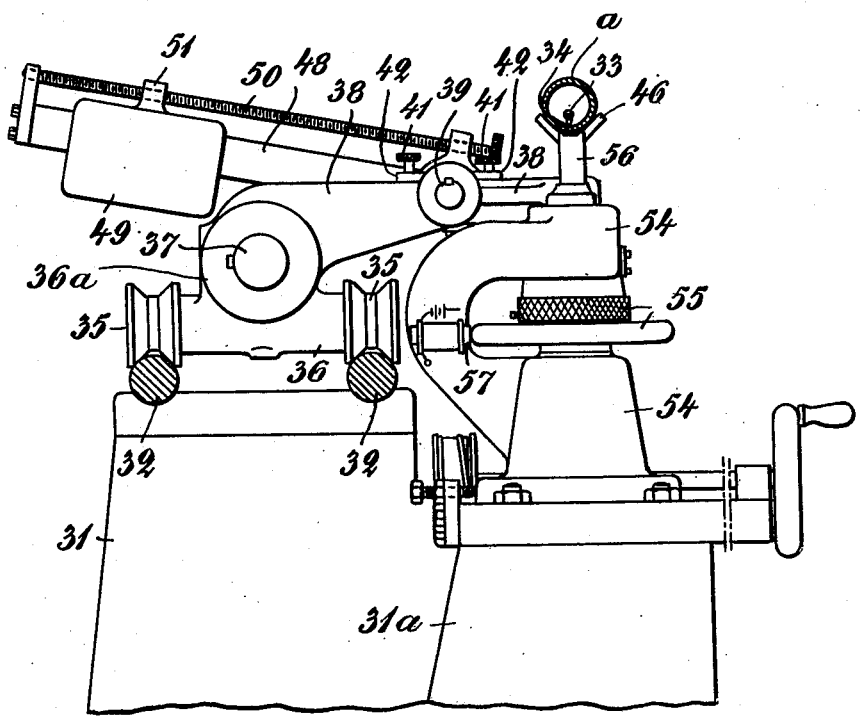

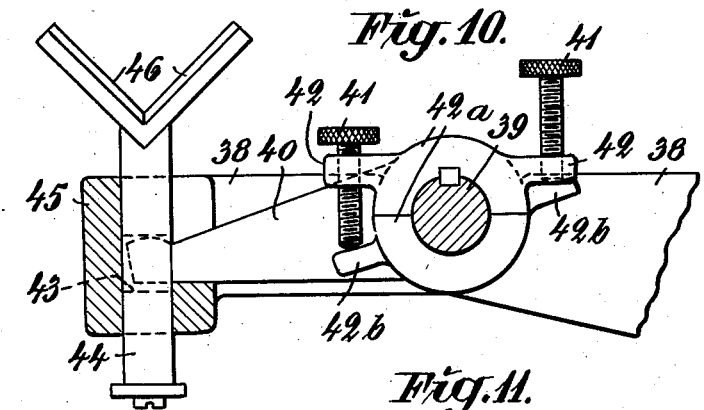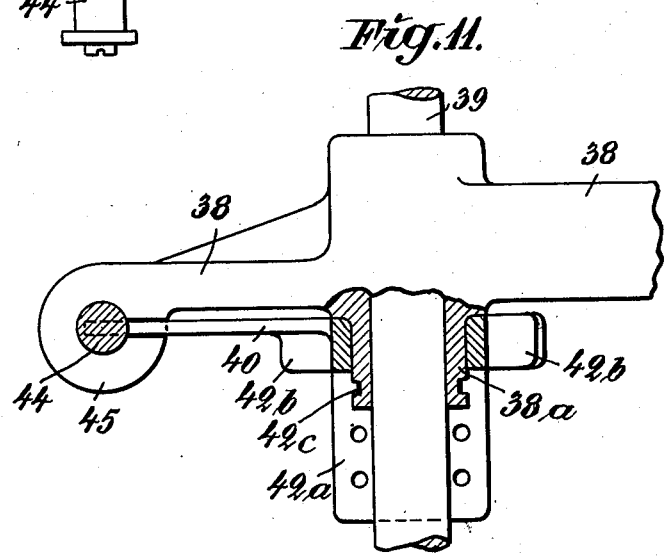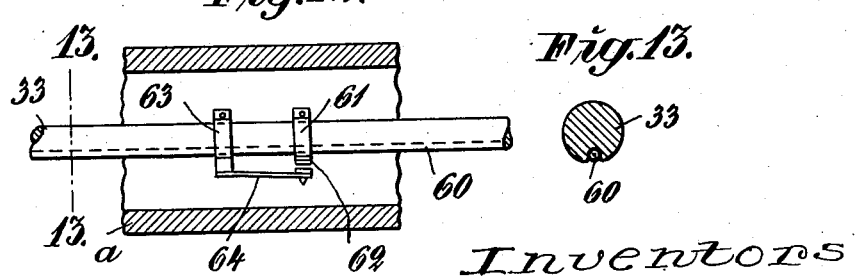

Patented June 13, 1950

2,511,276

UNITED STATES PATENT OFFICE 2,511,276

APPARATUS FOR MEASURING THE THICKNESS OF THE MATERIAL OF ARTICLES, SUCH AS TUBES, ETC.

Birger Ljungström, Stockholm, and Gustaf Hjalmar Larsson, Alsten, near Stockholm, Sweden, assignors to See Fabriks Aktiebolag, Sandviken, Sweden, a corporation of Sweden Application February 2, 1944, Serial No. 520,796
In Sweden February 12, 1943

6 Claims. (Cl. 33—143)

The measuring of the thickness of the material of articles at difficultly accessible points, for instance at different points of a tube, offers comparatively great difficulties. In certain cases, this measuring or control is, however, of very material importance, particularly in case of tubes having varying wall thickness, for instance those which are conical towards both ends outwardly as well as inwardly or are provided with conical portions or with swells on the insides or the outsides.

Said difficulties are eliminated in a comparatively simple manner by using an apparatus constructed according to the present invention which apparatus is suitable also for measuring the thickness of other articles, for instance plates, particularly when it is a question of controlling the thickness at points situated at comparatively great distances from the limiting edges of the articles, in which case the apparatus hitherto used for this purpose have proved to be more or less unsuitable.

A characteristic feature of the apparatus under consideration consists therein that it is provided with at least one pair of feeling members located opposite each other and on opposite sides of the article, one of which members is supported by a tautly stretched wire or rod and the other by the frame of the apparatus or by a part rigidly secured to the fixing points of the wire or rod, the feeling members, the wire or rod and its fixing points being so arranged as to permit relative movement between the article and the feeling members for the purpose of measuring the thickness of the material along the article in its entirety or the portion thereof intended to be measured, the thickness at the point of measurement being indicated by measuring or indicating instruments operatively connected to the feeling members.

According to a simple embodiment of the apparatus, the support thereof may consist of an elongated frame or the like, the ends of which are provided with fixing terminals for the wire or rod which together with the support is movable relatively to the article, or vice versa. However, such an embodiment practically is suitable only for measuring the thickness of the material of articles having comparatively small dimensions. Other embodiments, which are more particularly defined below, are suitable for measuring the thickness of the material of articles having larger dimensions. The floor, wall or other part of the building, wherein measurement takes place, may, in certain cases, form an integrant part of apparatus intended for the measuring of articles having particularly large dimensions.

According to certain embodiments, the adjustment of the feelers takes place automatically, and similarly the instrument or instruments indicate the adjustments automatically and thereby the thickness of the material at the point of measurement. The measuring may be carried out with the use of solely mechanical means or a combination of mechanical and electric means. If solely mechanical means are used, the feelers may be carried by two taut wires or straight rods and be connected to the measuring or indicating instrument via suitable motion transmission devices. In both cases the article, the thickness of the material of which is to be measured, is carried by a movable support which is adapted to carry said article parallel to the wires, so that they extend on opposite sides not only beyond the points to be measured but also beyond the article in its limit positions.

When a combination of mechanical and electric means is used, one of the feelers may consist of an electric contact device and the opposite feeler may consist of an adjustable measuring instrument. According to the last-mentioned embodiment, the contact device and the measuring instrument are so electrically interconnected across a source of current that the circuit is closed when the point of measurement is touched from two opposite directions by the contact device and the measuring instrument, to cause a sound or light signal to be brought about thus indicating that the thickness of the material has been measured.

In the current-conducting connection between the measuring instrument and the contact device an electromagnet may be directly or indirectly included to serve as a magnetic brake to brake or lock the measuring instrument, so that the adjusting movement of the latter is automatically interrupted and the reading of the correct measuring value is thereby ensured. A comparatively feeble contact current may be used for closing, across an electromagnet, the contact for a magnetic brake actuated by the light current.

Besides, the modification of the intended apparatus may be varied in many ways within the scope of the invention which, therefore, is not limited to those examples which are described in the following with reference to the accompanying drawings.

Figure 1 is an elevational view partly in section of a simple apparatus according to the invention. Figure 2 is an end view, as viewed from the left in Figure 1. Figure 3 is a side view of a portion of the apparatus according to an embodiment using only mechanical means. Figure 4 shows, on a reduced scale and diagrammatically, the last-mentioned embodiment in its entirety. Figure 5 is a side view of an apparatus according to Figure 3. Figure 6 is a cross-section of the apparatus according to Figure 5. Figures 7a, 7b are side views and Figures 8a, 8b plan views respectively of the apparatus according to an embodiment particularly intended for the measurement or control of the thickness of the material of comparatively long tubes. Figure 9 is, on a larger scale, a section along line 9—9 of Figure 7a. Figures 10 and 11 show details of the embodiment according to Fgures 7a, 7b and 8a, 8b. Figure 12 shows diagrammatically details of a modification of the apparatus according to Figures 7a, 7b, and 8a, 8b. Figure 13 is on a larger scale, a section along line 13—13 of Figure 12.

According to Figures 1 and 2, the apparatus consists of an elongated frame 1 or the like, the ends of which are provided with brackets or holders 2 and 3, which form tying points, for a supporting member in the form of a taut wire or rod 4. One end of the wire or the rod has an abutment 5 which bears on the bracket 2 when a nut, screwed onto the other end of the wire or the rod, is set against the other bracket 3, for the purpose of stretching the wire or the rod to a suitable degree. The bracket 2 is in the form of a fork (see Figure 2), so that the wire or the rod may be conveniently disconnected from the bracket so that a tube a may be introduced over the wire, as shown in Figure 1. Applied to the wire or the rod is a feeler 6, adapted to cooperate with the inside of the tube a, if it is intended to control the thickness of the material of a tube. The thickness of plates and the like may, of course, also be controlled by the use of the apparatus, in which case the feeler 6 has for its duty to cooperate with one side of the plate, etc. Opposite the feeler 6 there is provided another feeler 7, carried by the frame 1 and adjustably guided in the latter towards and away from the first-mentioned feeler. The feeler 7 is connected to an indicating instrument 8 carried by the frame, said instrument operating in response to displacement of the feeler 7. The starting position of the feeler 7 may be regulated in a suitable manner, e. g. by means of an adjusting nut 9, screwed onto a guide sleeve 10 or the like, designed for the feeler or the connections thereof with the indicating instrument, and carried by the frame.

For the purpose of electrically controlling the measuring operation there may be connected to the wire or the rod 4 or to the frame 1, an electric conductor 11, which across a current source 12 and a glow-lamp 13, is associated with the indicating instrument 8 and thereby also with the feeler 7. If desired, the current source and the glow lamp may be replaced by a pocket lamp (not shown). In the case of electric control, the feeler 7 and the indicating instrument 8 are electrically insulated from the frame, which may also be the case as regards the outside of the wire or the rod 4, so that unintentional contact-closing relatively to the article, the thickness of the material of which is to be measured, is prevented.

In the use of the apparatus, the wire is stretched to such an extent that the feelers 6 and 7 will directly contact each other, while at the same time the indicating instrument indicates zero position, whereby the indicating instrument is also utilized for indicating the intended tension of the wire. Thereafter, relative movement between the article and the apparatus is brought about—either by moving this latter or by moving the article—so that different portions of the article, e. g. the tube a are introduced between the feelers 6 and 7. As a result, the feeler 7 is displaced and actuates the indicating instrument which directly indicates the thickness of the material at the point of measurement in question. This apparently also takes place in case the measurement is carried out without electric control. If the apparatus, for the purpose of obtaining as great an accuracy as possible, is also provided with an electric controlling device, the circuit comprising the lead 11 is closed, inasmuch as contact is established between the feelers across the tube a which, in this case, is supposed to consist of current-conducting material. On account of the closing, the lamp 13 or the before-mentioned pocket lamp, ignites, whereby it is indicated that proper measuring conditions are present. After the measuring operation a zero indication by the indicating instrument shows that the position of the wire or rod has not been altered during measuring.

The apparatus may be resiliently suspended—vertically or horizontally—or be carried by levers loaded by counterweights. However, there is nothing to prevent the apparatus, particularly in the case of small dimensions, from being operated entirely by hand. Of course, indicating instruments of different kinds may be used and, if desired, be replaced by a simple lever pointer cooperating with a graduate sector. Yet, under all circumstances it is assumed that the instrument or indicating device employed has a high sensibility.

According to the embodiment shown in Figures 3 and 4, two strong steel wires 4 are fixed parallel to each other under tension in a suitable support which may be designed in many different ways, and, therefore, is not shown in the drawings. Each wire is, at one end, conveniently detachably secured to a stationary wire anchoring means 14 (see Figure 4) and at its other end connected to a hydraulically operable piston 15 or the like. The cylinders of the two pistons may communicate hydraulically so that the wires may be stretched equally and to the desired degree. Fastened to the wires are clamp sleeves 16 or the like which pivotally carry two mutually opposite, swingable feelers 17 having suitably the shape shown in the drawings. These feelers are pivotally connected to sleeves 18 which are slidable on the wires 4. The sleeves 18 are provided with arms 19 cooperating with the actuating members 21 of an indicator 20, which members tend to assume certain starting positions corresponding to the zero position of the indicator, in which latter position the feelers contact each other. The indicator may be carried by links 22 in a parallelogram like manner (see Figure 3).

It is to be noted that the upper member 21 of the indicator 20 (Fig. 3) is a reciprocal member, spring-actuated in the direction toward the right. Owing to said spring-actuation and to the fact that the indicator 20 is supported by the links 22 in the manner shown in the drawing, the arms 19 are acted upon so as to adjust the sleeves 18 in a position for normally closing the feelers 17. When said feelers are moved apart from each other by the wall of the tube a, the upper arm 19 is pressed against the upper member 21 and at the same time the lower arm 19 actuates the lower member 21 in the opposite direction as according to this embodiment of the invention the lower member 21 is not a reciprocal member but constructed as a finger or hook projecting from the casing of the indicator and catching the lower arm 19.

The article, the thickness of the wall of which is to be measured, is introduced between the feelers 17 which hence are operated and displace the sleeves 18, the consequence of which is that the arms 19 of the sleeves actuate the indicator 20, the deflection of the pointer of which directly indicates the thickness of the material at the point of measurement.

In case the article is in the form of a tube $a$, as indicated in the drawings, this is introduced over one of the wires 4. If the article, e. g. the tube, is comparatively long, the pairs of feelers as well as the indicator are preferably doubled so that the thickness of the material can be measured from each end of the tube, considered in the direction towards the centre, which embodiment is suggested in Figure 4, in which the positions of the feelers are indicated by the marking lines designated by $b$. Besides, the number of the wires or rods may, of course, be varied.

A movable support (not shown in Figures 3 and 4) carries the article, the thickness of the material of which is to be measured. In measuring the wall thickness of tubes there is suitably employed an apparatus consisting of two rods or tubes rigidly supported at their ends, and two tables arranged at the ends of the rods or tubes. The tubes, the wall thickness of which is to be measured, are placed on one of these tables. After measuring has been performed, the tubes are successively transferred to the other table.

Different types of indicating instruments or indicator devices may, of course, be used, and similarly the motion transmission device for the same may be varied. Instead of the instrument being arranged for direct reading, previously known devices for continuous registering of diagrams or for film-photographic exposure of the measuring result may be employed. Furthermore, the wires 4 together with the indicating instrument may, of course, be movable so as to be capable of being displaced in relation to the article, the thickness of the material of which is to be measured, which article in that case may be supported stationarily.

Figures 5 and 6 show an embodiment which broadly speaking corresponds to the embodiment according to Figures 3 and 4. The difference between these two embodiments consists essentially therein that, according to Figures 5 and 6, the feelers are movable parallelly along the wires, whereas both the wires 4 and the article, the thickness of the material of which is to be measured, are stationary. For this purpose, the sleeves 16 are not clamped on the wires 4, but are slidable thereon and rigidly connected to wires 23 which are slidably guided in longitudinal grooves 24 provided in the wires 4. Further, the indicating instrument 20 is carried in a parallelogram like manner by links 25 which are pivotally connected to cross-pieces 26 secured to the wires 23. Thus, the indicating instrument will participate in the travelling movement of the feelers which may be effected by means of suitable devices (not shown). As a matter of fact, the operation corresponds to that stated in conjunction with the description of Figures 3 and 4, and hence a description thereof may be dispensed with.

According to the embodiment shown in Figures 7a to 11, which mainly is adapted for measuring the wall thickness of great tube lengths, the apparatus is supported by strong bed pillars 31, on which a track formed by a pair of parallel rods 32 rests. Fixed under tension between the outermost bed pillars is a strong steel wire 33 parallel to the track, or the like. The tension of the steel wire may be regulated in a suitable manner, and one end of the same is conveniently detachable so that the wire may be introduced into the tube, the wall thickness of which is to be measured. Approximately in the middle of the steel wire there is provided an electric contact 34 which may be adjustable along the wire. Disposed on the track formed by the rods 32 is an elongated pipe supporting carriage mounted on rollers 35 running on the rods. The carriage consists of a number of cross-pieces 36 (see Figure 9), on the ends of which the rolls 35 are journalled. The cross-pieces are interconnected by means of a common bar 37 which passes through collars 36a on the cross-pieces, which latter may be adjusted along the bar 37. From the sleeves 36a extend arms 38 which in turn are provided with sleeves 38a (see Figure 11), in which a shaft 39 is rotatively mounted. On the sleeves 38a there are rotatively mounted auxiliary arms 40 situated in close proximity to the arms 38, which arms 40 may thus be adjusted angularly around the shaft 39. The adjustment may be regulated by means of set screws 41 (see Figure 10) which are threaded through projections 42 on auxiliary collars 42a which are spline guided on the shaft 39, inasmuch as splines secured to the collars extend into a longitudinal groove in the shaft (see Figure 10). The auxiliary collars 42a are connected to the arms 38 by means of annular flanges 42c entering into annular grooves provided in the sleeves 38a (see Figure 11). The set screws 41 cooperate with projections 42b on the arms 40. The free ends of the auxiliary arms 40 project into openings 43 in sliding pins 44 which are guided in heads 45 on the free ends of the arms 38. The upper ends of the pins 44 are in the form of V-shaped holders 46 adapted to carry the tube $a$ (see Figures 9 and 10).

Secured to the shaft 39, Figs. 8a and 9, is a further arm 48, on which is movably disposed a counterweight 49 which may be adjusted along the arm by the aid of a screw 50 threaded through a projection 51 on the counterweight 49.

By the adjustment of the arms 40 the holders 46 may be adjusted in such a manner that the tube $a$ will rest loosely in all of the holders independently of its longitudinal profile, while at the same time a generatrix of the tube wall, located at the lower side, becomes as much as possible parallel to the steel wire 33.

After this adjustment has been carried out, the counterweight 49 is set in such a position that the tube exerts only a slight pressure against a measuring instrument more particularly indicated in the following.

The carriage may be moved along the track by means of an endless rope 52 passed over rope pulleys 53 which are supported by the outermost bed pillars 31.

Adjustably mounted on a special bed pillar 31a, Figs. 7a and 8a, located midway between the outermost bed pillars, is a support 54 for a measuring instrument which, according to the illustrated embodiment, is formed of a micrometer screw 55, 56, cooperating with a distinct graduation. The micrometer screw is located directly under the tube a and is connected, across a current source, to the steel wire 33 and the contact 34. Included in the circuit is an electric lamp (not shown) which lights when the circuit is closed. Moreover, the circuit contains an electromagnet 57 (Fig. 9), which upon the closing of the circuit brakes or locks the micrometer screw so that the adjustment of the latter is automatically interrupted upon the closing of the circuit and the reading of the right measuring value of the wall thickness of the tube is ensured.

For adjusting the micrometer screw 55, 56, to zero position it is screwed up towards the electric contact 34 so that the circuit is closed and the lamp lights and the braking action of the magnet is effective. By this a definite initial position for the measurement is obtained. Then the micrometer screw is screwed backwards, whereupon the carriage supporting the tube in the right manner in relation to the steel wire, is moved forwards to the desired point of measurement, where the micrometer screw is screwed up towards the tube which, on account of the fact that the counterweight 49 has previously been adjusted in a suitable manner, rests with only a slight pressure against the micrometer screw which thereafter is screwed upwards for raising the tube, until the contact 34 touches the inside of the tube. By this operation the circuit is closed across the tube, and the lamp ignites, besides which the adjusting movement of the micrometer screw is automatically braked by the magnetic brake 57. The wall thickness of the tube at this point may be directly read on the scale of the micrometer screw. After the micrometer screw has been screwed backwards and the carriage has been displaced, the wall thickness may, in a corresponding manner, be read off concerning any other point of the tube.

According to the embodiment last described it is assumed that the tube or article a, the thickness of the material of which is to be measured, consists of current-conducting material. However, this is not necessary if the contact device and the current conductors are modified in a suitable manner. An embodiment thereof is shown in Figures 12 and 13. According to this example, in the wire 33 there is provided a longitudinal groove for the reception of a small wire 60 which is electrically insulated from the wire 33 in a suitable manner. The wire 60 is connected to a ring clamp 61, or the like, located on the wire 33 and electrically insulated from this latter, which clamp is provided with a contact 62. Fastened to the wire 33 is another electrically insulated ring clamp 63 or the like, provided with a contact spring 64 which normally occupies contact break position relatively to the contact 62. The wires 33 and 60 are interconnected via a current source, and included in the circuit is moreover an acoustic or light signalling device which operates when the circuit is closed. As previously stated, the circuit also includes a magnetic brake such as 57, for automatic braking of the micrometer screw. When upon the adjustment of the micrometer screw the tube actuates the contact spring 64, and the latter is caused to touch the contact 62, the circuit is closed and the signalling device operates to indicate that the wall thickness has been measured so that such thickness can be read off on the measuring scale. At the same time the micrometer screw is automatically braked and locked by the magnetic brake so that overadjustment is avoided.

We claim:

1. An apparatus for measuring the thickness of the material of articles, such as tubes, plates or the like, particularly at points situated at comparatively great distances from the ends or the limiting edges of said articles, comprising a wire-like member fixed at points located at a distance from each other, means for tensioning the wire-like member, a feeling member supported by said wire-like member at a point intermediate said fixing points, a second feeling member located opposite to the first mentioned feeling member, and a measuring instrument combined with the second feeling member and adapted to indicate zero position when contact occurs between the feeling members.

2. An apparatus for measuring the thickness of the material of articles, such as tubes, plates or the like, particularly at points situated at comparatively great distances from the ends or the limiting edges of said articles, comprising a wire-like member fixed at points located at a distance from each other, means for tensioning the wire-like member, a feeling member supported by said wire-like member at a point intermediate said fixing points, a second feeling member located opposite to the first mentioned feeling member and a measuring instrument combined with the second feeling member and adapted to indicate zero position when contact occurs between the feeling members, which consist of electric contacts connected to each other via a current source and adapted to effect current-closing when the point of measurement on the article is touched by them from opposite directions.

3. An apparatus for measuring the thickness of the material of articles, such as tubes, plates or the like, particularly at points situated at comparatively great distances from the ends or the limiting edges of said articles, comprising a wire-like member fixed at points located at a distance from each other, means for tensioning the wire-like member, a feeling member supported by said wire-like member at a point intermediate said fixing points, a second feeling member located opposite to the first mentioned member, a measuring instrument combined with the second feeling member and adapted to indicate zero position when contact occurs between the feeling members, which consist of electric contacts connected to each other via a current source and adapted to effect current-closing when the point of measurement on the article is touched by them from opposite directions, and an electromagnet included in the current-conducting connection between the electric contacts and adapted to serve as a magnetic brake and, at current-closing, brake or lock the measuring instrument so that the adjusting movement of the latter is automatically interrupted.

4. An apparatus for measuring the thickness of the material of articles, such as tubes, plates or the like, particularly at points situated at comparatively great distances from the ends or the limiting edges of said articles, comprising a wire-like member fixed at points located at a distance from each other, means for tensioning the wire-like member, a feeling member supported by said wire-like member at a point intermediate said fixing points, a second feeling member located opposite to the first mentioned feeling member and a measuring instrument combined with the second feeling member and adapted to indicate zero position when contact occurs between the feeling members, a track, said wire-like member being parallel to said track and a carriage movable on said track to support the tube in such a manner that an inner tube wall generatrix becomes parallel or substantially parallel to the wire-like member.

5. An apparatus as claimed in claim 4, in which the carriage supporting the tube is provided with a number of adjustable holders which carry the tube at different points along the length thereof in an adjustable manner, so that the tube, independently of its longitudinal profile, may be freely supported with an inner wall generatrix parallel or substantially parallel to the wire-like member.

6. An apparatus as claimed in claim 4, in which the carriage consists of a number of cross-pieces provided with supporting rollers for engaging the track, a rod on which the cross-pieces are adjustable, arms on said cross-pieces, holders guided in said arms in such a manner that they may be raised and lowered, auxiliary arms for effecting raising and lowering of the holders, said auxiliary arms being operatively connected with the first-mentioned arms, and a shaft passing through all of the arms and fixed to the auxiliary arms for actuating the latter.

BIRGER LJUNGSTRÖM.
GUSTAF HJALMAR LARSSON.

REFERENCES CITED

The following references are of record in the file of this patent:

UNITED STATES PATENTS

| Number | Name | Date |
|---|---|---|
| 1,239,532 | Sponsel | Sept. 11, 1917 |
| 2,290,940 | Carson | July 28, 1942 |

FOREIGN PATENTS

| Number | Country | Date |
|---|---|---|
| 47,971 | Switzerland | Aug. 1, 1900 |
| 571,751 | Germany | Mar. 9, 1933 |